United States Patent [19]

Dragon et al.

[11] 4,090,790
[45] May 23, 1978

[54] APPARATUS FOR TESTING THE REFRACTIVE POWER(S) OF LENSES

[75] Inventors: Martin Stephen Dragon, Sturbridge; Peter Parkhill Clark, Brookfield, both of Mass.

[73] Assignee: American Optical Corporation, Southbridge, Mass.

[21] Appl. No.: 703,492

[22] Filed: Jul. 8, 1976

[51] Int. Cl.² .............................................. G01B 9/00
[52] U.S. Cl. .................................................. 356/125
[58] Field of Search ........................ 356/124, 125, 127

[56] References Cited

U.S. PATENT DOCUMENTS

| 1,204,030 | 11/1916 | Kellner | 356/125 |
|---|---|---|---|
| 3,323,417 | 6/1967 | Grey et al. | 356/125 |
| 3,768,910 | 10/1973 | Zanoni | 356/125 |

FOREIGN PATENT DOCUMENTS

| 1,001,020 | 1/1957 | Germany | 356/124 |
|---|---|---|---|
| 2,159,820 | 6/1972 | Germany | 356/125 |
| 2,528,818 | 1/1976 | Germany | 356/125 |

*Primary Examiner*—John K. Corbin
*Assistant Examiner*—R. A. Rosenberger
*Attorney, Agent, or Firm*—Jeremiah J. Duggan; Stephen A. Schneeberger

[57] ABSTRACT

The refractive power(s) of a lens which may possess cylindrical power are determined by retro-reflecting a particular target image through an optical system and varying the axial positioning of one or more elements in the system to bring the reflected image to one or two clear and unambiguous foci at a target plane. By employing a small, intense diffraction image as the target image and further detecting only reflected light passing through a pinhole area on the optical axis at the target plane, a single significant light energy peak is observed at system focus for a lens possessing sphere power only and two significant light energy peaks appear at the respective foci of the principal meridians if the lens also has cylinder power. Means are provided for recognizing the existence, number, and/or relative size of light energy peaks and for correlating their occurrence with the position of the movable element in the optical system to determine respective refractive powers of the test lens.

9 Claims, 3 Drawing Figures

APPARATUS FOR TESTING THE REFRACTIVE POWER(S) OF LENSES

BACKGROUND OF THE INVENTION

The present invention relates to optical testing apparatus. More specifically the invention relates to apparatus for determining the refractive power(s) of lenses, including spherical power and cylindrical power.

During or after their manufacture, lenses, and particularly ophthalmic lenses, are conventionally subjected to various tests to insure that they possess the optical characteristics for which they were designed. For example, ophthalmic lenses are generally tested to at least determine their refractive powers. For a lens having only spherical power, the refractive power will be the same in all meridians; however, a lens may additionally include a cylindrical power component, either intentionally or unintentionally, and thus exhibits one refractive power in one principal meridian of the lens and a different refractive power in the other principal meridian orthogonal thereto.

The measurement of refractive power(s) of ophthalmic lenses has typically been performed with a lens measuring instrument in which an operator positions the test lens and, looking at the eyepiece, rotates and translates a target until one set of lines of the target is in good visual focus. A dial on the instrument then indicates the power in diopters. If the lens is toric and has a cyclindrical component, the operator continues to translate the target until another set of lines thereof (orthogonal to the first set) is visually in focus. The power of that meridian is then read. In such a device, the power of the lens is a linear function of the position of the movable target.

It will be appreciated that the use of this type of lens measuring instrument is slow and is subject to the inaccuracies introduced by the determination of a "focussed" condition using the human eye and mind. Further, the operation of such instrument requires a trained and experienced operator.

In U.S. Pat. No. 3,323,417 to Grey et al. a technique is described in which a light beam is passed through a reticle or object pattern, such as a grid, and the lens to be tested is used as a part of an optical system which focuses and reflects the image of the grid back through the grid to a photo responsive cell. Electrical signals are generated in response to the amount of light reflected back through the grid, and those signals are at a maximum when the reflection of the grid image is focused on the grid. Displacement of the test lens from a reference position to a position at which the grid image is focused on itself is indicative of the focal length of the lens. The principal of retro-reflection serves to cancel the effects of possible prism in the system.

The technique of the aforementioned patent is discussed in connection with lenses typically for photographic applications and normally possessing only sphere power. The "suitable object pattern" is specifically described as being a "grid system having a plurality of slits." While such an arrangement may be satisfactory for the determination of power in a lens having only sphere power, it is less than satisfactory if the lens also possesses cylindrical power, as would be the case for correction of astigmatism. Assuming slits extending in only one direction, the pattern will be clearly imaged on itself only for the principal meridian of the lens extending parallel to the slit, thereby requiring 90° rotation of the lens or target if both meridians are to be separately clearly imaged. Even if the object pattern is provided with orthogonally extending slits, it is necessary to place the principal meridians of the lens in alignment with the object pattern.

Other systems which are capable of objective and accurate determination of spherical and cylindrical lens power are handicapped by their expense and/or complexity and/or limitation of the lens power measurement range.

SUMMARY OF THE INVENTION

Accordingly, it is an object of the present invention to provide an apparatus for accurately determining the power(s) of a lens in each of its principal meridians, including lenses which are toric and possess cylindrical power.

It is a further object of the invention to provide such novel apparatus which is adaptable to automatic measuring techniques. Included in this object is the ability to measure sphere and cylinder powers of a lens without having to locate the principal meridians of the lens.

It is an even further object of the invention to provide such apparatus in which all standard ophthalmic lenses may be tested.

It is a still further object of the invention to provide such apparatus which is sufficiently simple in design to enable utilization thereof in field as well as manufacturing applications in a manner which will be economical and reliable.

Briefly, the invention comprises apparatus for determining the refractive powers of lenses which may possess cylindrical power. The apparatus includes an optical system having an optical axis and comprising a station on the axis for a lens to be tested, means for providing a particular distribution of light at a target position on the axis for projection through the system, reflecting means at one end of the system for reflecting the projected light from the target position back through the system, means for focusing the projected light at the reflecting means and for refocusing the reflected light at the target position and occluding means having an aperture therein and being positioned on the optical axis at a position which is the optical equivalent of the target position. Means is provided for supporting a lens to be tested at the test station. Means is provided for varying the axial spacing between the target position and another portion of the optical system to refocus the reflected light at the target position when a test lens is at the test station, the relative positioning of the target position with the other portion of the system being indicative of the refractive power in a respective one of the principal meridians of the test lens. Light sensing means is positioned to receive only the light reflected back through the system and through the occluding means aperture for generating an electrical signal.

The amplitude of the signal is proportional to the total energy of the sensed light, and the distribution of light at the target position and the aperture are each configured such that the total energy of the sensed light "peaks", or attains a local maximum, whenever the reflected light is substantially refocused at the occluding means and the target position in each principal meridian of the lens, regardless of its angular orientation in the system. A single such peak occurs when the test lens possesses only spherical power and two such peaks exist when the lens also possesses cylindrical power. Means responsive to the light energy signal indicates the refractive power of the lens in the respective principal meridians as a function of the occurrence of the light energy signal peaks relative to the displacement between the target position and the other portion of the system.

In the illustrated embodiment of the invention, the aperture in the occluding means and the particular distribution of light at the target position are both of small circular configuration, the aperture comprising a so-called "pinhole" and the light at the target position being the diffraction image or spot resulting at the focal plane of a target lens when a collimated beam of light, as from a laser, is passed through the target lens. The target lens is movable axially along the optical system for axially moving the target position to refocus the projected and reflected light at the aperture for each respective principal meridian of each lens under test. The diameter of the pinhole aperture is no larger than, and preferably smaller than, the smallest dimension of the reflected diffraction image when focused on the occluding means.

The occluding means is spaced axially from the reflecting means a greater distance than is the target position. The target lens additionally functions to collimate the reflected light and direct it, by way of a beam splitter, through an objective lens to a focal plane at the occluding means. The laser beam is introduced to the optical system also via the beam splitter.

Means are also provided for generating a signal indicative of the axial spacing between the target position and the other portion of the optical system, that signal being representative of the refractive power of a lens positioned in the system. The means for indicating refractive power is additionally responsive to the refractive power representing signal to directly indicate substantially the refractive power of the respective principal meridian of a test lens in the system. In order to accurately identify only those light energy signal peaks which are representative of the power of a lens in one or the other of its principal meridians, the lens power indicating means is responsive only to light energy signals exceeding a predetermined amplitude threshold level and further, to no more than the two signal peaks of greatest magnitude. Further still, the lens power indicating means responds only to the light energy signal peak of greatest magnitude if the relative magnitude between it and the next largest signal peak differs by a ratio greater than 2:1.

Further object, advantages and features of the invention will become apparent upon consideration of the following detailed description in conjunction with the appended drawing.

DESCRIPTION OF THE PREFERRED EMBODIMENT

Figure 1:
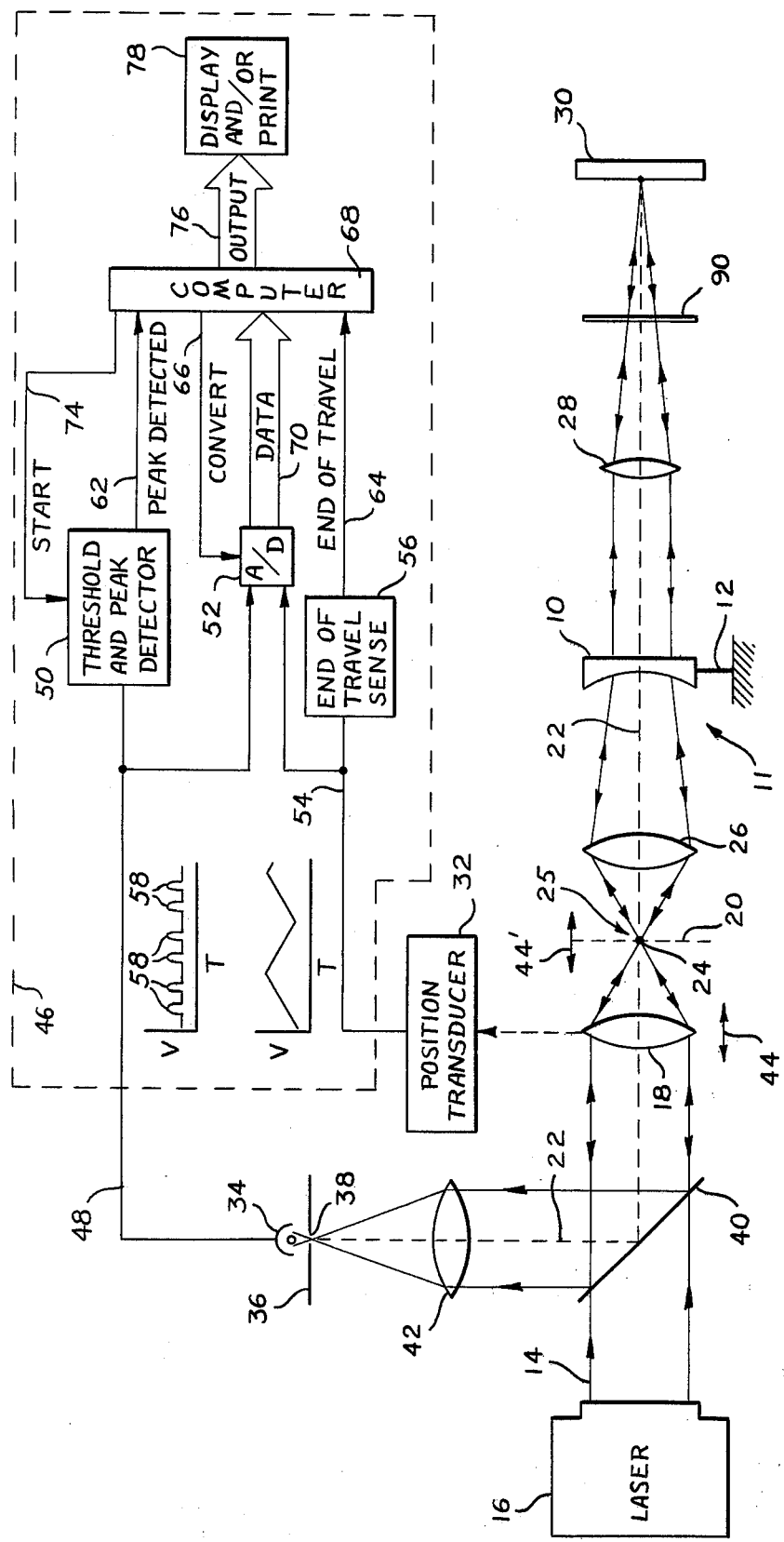
FIG. 1 illustrates, in schematic form, the lens testing apparatus in accordance with a preferred embodiment of the present invention.

FIG. 1 illustrates apparatus in accordance with the present invention for performing refractive power measurement tests on lenses. More specifically, the apparatus illustrated in FIG. 1 is described for use in measuring the spherical and additionally the cylindrical power of lenses, and particularly ophthalmic lenses.

In FIG. 1 reference number 10 identifies the lens to be tested. In the illustrated embodiment, the lens 10 is an ophthalmic lens which possesses spherical power and may additionally possess cylindrical power. It will be appreciated that ophthalmic lens 10 might be a plano lens possessing no significant spherical or cylindrical power, in which case the measurement of the lens' refractive powers is for the purpose of assuring that its refractive powers do not exceed some maximum limit. Lens 10 is supported at test station 11 on the optical axis 22 of the optical system by appropriate support structure schematically illustrated at 12 and is adapted to be positioned in the path of a beam of light 14. The beam 14 originates as a polarized, collimated beam from Helium-Neon laser 16 and passes through a target lens 18 to a focus in the focal plane of lens 18 indicated by broken line 20. The focus of beam 14 occurs on the optical axis 22 at a so-called target position 25 in focal plane 20 and takes the form of a diffraction image or spot 24. The diffraction image 24 is inherently round and of small diameter, this configuration being preferred according to the invention as will hereinafter become evident. While the light at target position 25 for projection through the optical system is here obtained from laser 16, it will be appreciated that other light sources and optical subsystems capable of forming a high intensity, small diameter concentration of light at position 25 would also be suitable.

The light emanating from target position 25 and appearing as diffraction spot 24 is projected through that portion of the optical system which includes a standard lens 26, the test lens 10 at station 11, and a retro-reflector comprised of objective lens 28 and mirror 30, each being on the optical axis 22 of the system. A quarter-wave retardation plate 90 is positioned intermediate lens 28 and mirror 30 to impart a 90° rotation to the polarization of the reflected light to avoid interference with the laser.

The light from diffraction spot 24 which is incident on the front-surface mirror 30 is reflected back through the objective lens 28, the test lens 10 at station 11 and the standard lens 26 to a point of focus in the region of, but not necessarily at, the focal point 20 of the target lens 18. For the particular refractive power of a lens 10 in the system, the reflected light may be brought to a focus at a point substantially coincident with the diffraction spot 24 in image plane 20 by adjusting the position of at least one of the optical elements in the system.

In the present system, the target lens 18 is mounted for variable axial positioning such that the focal plane 20, and thus diffraction spot 24, is movable axially of the system. Mirror 30 is positioned at the focal plane of objective lens 28, and the standard lens 26 is chosen and positioned within the system such that when light from diffraction spot 24 is retro-reflected and refocussed in focal plane 20, the optical system is said to be in focus and the rear vertex power of the test lens 10 is linearly proportional to the displacement of the focal plane 20 relative to a fixed position in the system. Stated another way, the rear vertex power of the test lens 10 is a function of and is indicated by the axial spacing between the focal plane 20 and the standard lens 26.

By knowing the axial position of target lens 18 within the optical system when a condition of refocus of the reflected light occurs at focal plane 20, it is thus possible to express the power of the lens 10 in diopters, for example. Accordingly, a means such as position transducer 32 operatively connected to the target lens 18 is capable of providing an electrical signal indicative of the axial position of lens 18 in the optical system relative to the position of standard lens 26. Position transducer 32 might typically be a linear variable differential transformer which provides an output signal proportional to the axial displacement of target lens 18 from some reference position.

Assuming that the test lens 10 possesses only spherical power, the diffraction spot 24 projected through and reflected back through the optical system will be refocused at focal plane 20 for that single positioning of target lens 18 which places plane 20 in the same plane of the focus of test lens 10 in combination with the standard lens 26. When this condition of focus is met, the reflected image appearing at focal plane 20 will correspond substantially with that of the original diffraction image provided at the focus of target lens 18. Stated another way, when the optical system is in focus for a test lens 10 of particular power, the reflected light appearing in focus at focal plane 20 and on the optical axis 22 will be of maximum intensity relative to the intensity at non-focused conditions. When the focal plane 20 of target lens 18 does not coincide with the focal plane associated with the reflected light from target lens 10, the reflected light appearing at focal plane 20 assumes the shape of a circle, in the illustrated embodiment, and has an intensity on optical axis 22 which is less than that occurring during the condition of system focus. These conditions of focus and non-focus are illustrated in the bottom portion of FIG. 2. With means provided for sensing the energy of reflected light in a small unit area concentric with axis 22 of the optical system it is then possible to note when the condition of system focus occurs by recognizing the signal representative of maximum or peak light energy as being indicative of the condition of system focus. Such light responsive means are provided by the photo detector 34 in the illustrated embodiment.

Should the ophthalmic test lens 10 be toric and include a component of cylindrical power, either inadvertently or intentionally for the correction of astigmatism of the eye, the lens will exhibit a focus in each of two axially spaced focal planes. The lens possessing a cylindrical component of power is said to have two principal meridians, one meridian being parallel to the axis of the cylinder and the other principal meridian being orthogonal thereto. The powers of such a lens are measured along the respective principal meridians. Instead of the lens having a single point focus, as with the lens of sphere power only, it exhibits a so-called line focus in each of the two respective principal meridians of the lens. Because of this characteristic, a target image retroreflected through the optical system appears at focal plane 20 as an ill-defined image of low light intensity for conditions other than the two in which the system is in focus. For the two axial spacings of target lens 18 in which the optical system is in focus, the reflected light appearing at focal plane 20 will, in the illustrated embodiment, appear as bright lines extending through the optical axis 22, one such bright line being orthogonal of the other. These conditions of non-focus and focus of the optical system when test lens 10 has cylinder power and utilizes a small circular target image such as a pinhole, are illustrated in the bottom portion of FIG. 3.

In accordance with the invention, the photodetector 34 is permitted to detect only that retro-reflected light appearing in a very small circular area substantially coaxial with the optical axis 22. This is accomplished by positioning a light occluding means, such as opaque mask 36, at a position in the optical system which is optically conjugate with the focal plane 20 in target position 25 and by further providing a small pinhole aperture 38 therein coaxial with the optical axis 22. This arrangement permits photodetector 34 to respond only to light energy variations within a very small area on or concentric with the optical axis 22. Because this small area about the optical axis is all that is being viewed, the angular orientation of lens 10 is not critical and it is unnecessary to effect relative rotation between the test lens 10 and the target to attain optical alignment therebetween in each of the two principal meridians as had been the case in most prior art systems. Preferably, the diameter of pinhole aperture 38 is equal to or smaller than the diameter of the reflected light image at focal plane 20 when the optical system is in focus with a test lens possessing only spherical power, as illustrated in the bottom portion of FIG. 2. Similarly, the diameter of aperture 38 is preferably equal to or smaller than the width of the narrow line images at plane 20 for the foci of the optical system when a lens with cylindrical power is present, as illustrated in the bottom of FIG. 3.

Figure 2:
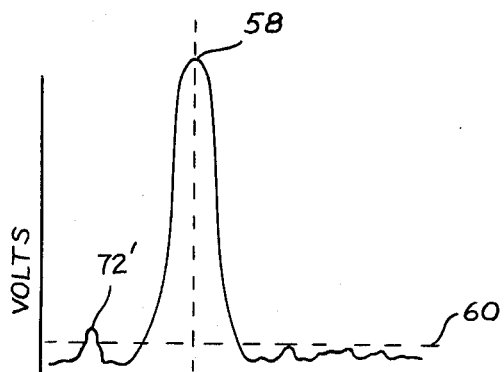
FIG. 2 is a graphical representation of the amplitude of an electrical signal generated in response to light received through the particular aperture of the optical system of the apparatus with the test lens possessing only spherical power.
Figure 2:
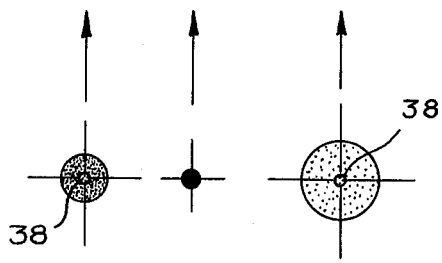

The condition of optical system focus is recognized by an increase in the amount or energy of light detected by sensor 34, and, because the aperture 38 is of such small area, it is desirable that the source of light providing the diffraction spot 24 and accordingly the refocused image at focal plane 20 be of relatively strong intensity. Further, the two light energy peaks experienced when passing through the optical system foci for a toric test lens will be of less amplitude than for the single peak exhibited at the system focus for a lens having only sphere power, this being because the aperture 38 sees a smaller portion of each line-focused image (FIG. 3) than it does of the point-focused image (FIG. 2). The laser 16 serves to provide the requisite intensity of light to the optical system.

While it will be appreciated that the apertured mask 36 might be positioned at the focal plane 20 of target lens 18, and the photodetector 34 conceivably positioned off-axis immediately therebehind, in the illustrated embodiment the retro-reflected light refocused at focal plane 20 instead continues back through the optical system through target lens 18, where it is collimated, and is incident upon a polarizing beam splitter 40 which redirects the collimated reflected light at another angle along the optical axis 22 through objective lens 42 to the aperture 38 in mask 36. Mask 36 lies in the focal plane of objective lens 42. This arrangement permits the opaque mask 36 and the photodetector 34 to be fixedly positioned and further removes the photodetector 34 from the path of the laser light being focused at target position 25 by the target lens 18. The polarizing beam splitter 40 operates to pass light directed toward mirror 30, but fully reflects the returned light which has been rotated in polarization 90° by quarter wave retardation plate 90. In this manner, the returned light is prevented from entering and interfering with laser 16.

Figure 3:
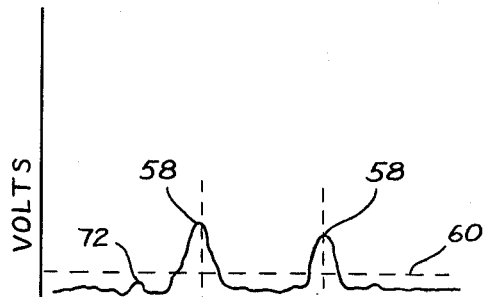
FIG. 3 is a graphical representation similar to that of FIG. 2 but resulting from a lens possessing both spherical power and cylindrical power.
Figure 3:
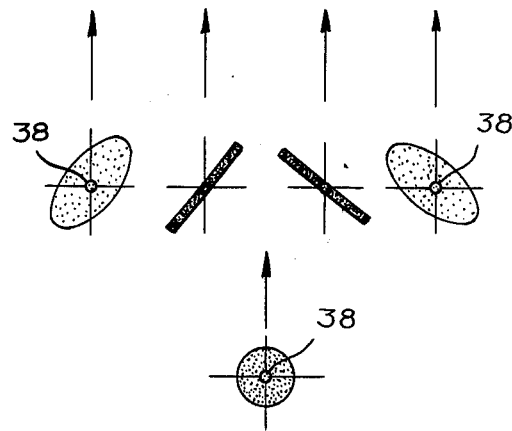

As previously discussed when the target lens 18, or more specifically its focal plane 20, moves through a focus of the test lens 10 the energy of light detected at photodetector 34 and the resulting electrical signal provided as an output therefrom reaches a maximum or a peak, a single such peak existing for a test lens having only spherical power as illustrated in the graphical display of FIG. 2 and two such peaks occurring for a toric lens possessing cylinder power as graphically illustrated in FIG. 3. While it would be possible to manually move target lens 18 axially of the optical system in order to move the focal plane 20 through the focus of the test lens 10, it is preferable in accordance with the present invention that target lens 18 be automatically reciprocated axially along the optical system by conventional oscillating or reciprocating means (not shown). The range of axial reciprocation of target lens 18 is established to be sufficient, in combination with the other elements of the optical system, to cover the full range of powers to be anticipated from the various lenses to be tested. This range of axial displacement of target lens 18, and accordingly its focal plane 20, are illustrated by the range arrows 44 and 44' respectively. In the illustrated embodiment, the displacement range 44 is about 4 centimeters and corresponds with a lens power range of about ±20 diopters.

Referring now to the signal processing and display portion of the lens power measuring apparatus, generally contained within the broken line portion 46 of FIG. 1, the electrical signal respresentative of sensed light energy is carried by conductor 48 to the respective inputs of a threshold and peak detector 50 and an analog-to-digital (A/D) converter 52. The electrical signal from position transducer 32 representative of the position of target lens 18 in the optical system is carried by conductor 54 to the respective inputs of the (A/D) converter 52 and the end-of-travel sensing circuitry 56.

The waveform of the target lens position signal is represented graphically in FIG. 1 adjacent to conductor 54 and shows a linear increase in the voltage as target lens 18 moves from one axial extreme of its range to the other and a linearly decreasing voltage as the target lens returns to the first extreme. Accordingly, each specific voltage from position transducer 32 is representative of a particular axial positioning of the target lens 18 with the optical system.

Similarly, the signal on conductor 48 indicative of sensed light energy has a waveform, shown graphically in FIG. 1 adjacent conductor 48, which exhibits voltage maxima or peaks 58 substantially at the time each focal point 20 passes through a particular focus of the test lens 10/standard lens 26 combination. The test lens 10 illustrated in FIG. 1 is assumed to be toric and possess cylinder power, thus exhibiting two voltage peaks 58 for each pass of target lens 18 through its axial displacement range.

In the instance of a test lens 10 which possesses only spherical power, the signal peak 58 occurs exactly at the condition of optical system focus; however when the test lens is toric, and particularly when two powers (foci) are nearly the same, the two signal peaks may interact such that the positions of the two observed peaks might only be substantially representative of lens powers, rather than exactly so. However, any error in this latter regard is normally within the limits of tolerance.

The threshold and peak detector 50 employs conventional circuitry for detecting the precise point in time at which a voltage peak 58 on conductor 48 occurs so long as the voltage of the peak exceeds some predetermined threshold level. The predetermined threshold voltage, represented by the dotted lines 60 in FIGS. 2 and 3, is selected such that the signal voltage due to ambient light conditions and most small voltage peaks due to random and spurious electrical and optical phenomena will be excluded from the peak detection circuitry. The peak detection circuitry is operative in a known manner to provide an output signal pulse on conductor 62 each time a signal peak above the threshold voltage is detected. The PEAK-DETECTED signal is substantially concurrent with the peak which it signifies.

The END-OF-TRAVEL sensing circuitry 56 may be of a conventional design which is capable of generating an END-OF-TRAVEL output pulse on conductor 64 at the two voltages respectively commensurate with the extremes of axial travel of the target lens 18, or at the positive and negative peaks of the linear sawtooth waveform indicative of the lens position, or upon the occurrence of some other characteristic commensurate with lens 18 being at an extreme of its axial travel.

The sensed light energy signal on conductor 48 and the lens position signal on conductor 54 are both applied as inputs to A/D converter 52 which, upon receiving a CONVERT pulse on conductor 66, converts the respective signal to a commensurate respective digital form and applies the respective digital signals to the input of a digital computer 68 by way of data input conductors 70. The PEAK-DETECTED signal on conductor 62 is applied to the input of computers 68 and serves to generate the CONVERT pulse appearing on conductor 66. Thus, each time a light energy signal peak exceeding the predetermined threshold is detected, the signal amplitude of the light energy signal is converted to a digital signal which is extended into computer 68. At the same time, the CONVERT pulse converts the particular voltage from position transducer to a digital signal which is extended to computer 68. As mentioned, the voltage on conductor 54 is proportional to and representative of a particular lens power. Thus, each time peak amplitude information is introduced to computer 68, there is also introduced information indicative of the test lens power which would result in the sensed light energy signal exhibiting a peak at that moment.

While the computer 68 may be any of a variety of digital computers capable of processing the input data in a manner to be hereinafter described, the particular computer utilized in the illustrated embodiment is a NOVA 1220 computer manufactured by Data General Corporation of Southboro, Massachusetts. Electronic computer 68 contains a program prepared in accordance with the instructions contained in the publication "How to Use The NOVA Computers" by Data General Corporation.

The computer program provides that computer 68 will recognize and store only the two sensed light energy signal peaks of greatest amplitude. This may be accomplished by initially storing all sensed light energy peaks detected and subsequently rejecting all but the two of greatest magnitude, or the selection process may occur continuously throughout the scanning cycle whereby only the two sensed light energy signal peaks of greatest amplitude up to any point in time in the cycle are retained. This process is intended to recognize that either one or two, but no more than two, light energy signal peaks are capable of representing the power(s) of test lens 10 and serves to exclude any random signal peaks which may have exceeded the threshold level 60 but necessarily are not indicative of the power of a test lens, as for instance peak 72 in FIG. 3. However, should a similar random signal 72' occur when the test lens 10 possesses only spherical power and thus has only one valid light energy signal peak 58, as illustrated in FIG. 2, it is desirable that only one signal peak be recognized.

Accordingly, computer 68 at the completion of a scanning cycle compares the two stored signals representative of light energy signals of greatest amplitude and rejects that signal having the smaller magnitude if the relative magnitude between the two signal peaks differs substantially. In the illustrated embodiment a magnitude ratio of 2:1 was chosen for this determination. In other words, if the two signal peaks of greatest magnitude differ from one another in magnitude by a ratio greater than 2:1 then only the larger of the two is presumed to be indicative of a focused condition in the optical system; however if the smaller of the two is more than half the amplitude of the larger, both signal peaks are presumed to represent conditions of focus in the optical system and thus, a component of cylinder power in the test lens 10. It will be appreciated that a signal magnitude relationship other than 2:1 might be selected depending upon the particular electro-optical system employed.

Typically, the target lens 18 will continuously reciprocate and either the introduction of test lens 10 into the optical system or the manual actuation of a switch (not shown) will serve, through computer 68, to generate a START signal on conductor 74 which is applied to peak detector 50. Peak detector 50 is normally disabled and the START pulse, which is timed to coincide with an END-OF-TRAVEL pulse, enables the detector 50 to enter PEAK DETECTED signals in the computer 68. Similarly, the occurrence of the next END-OF-TRAVEL pulse serves to terminate the scanning cycle within computer 68 and commences the signal amplitude comparison determinations, as well as other signal processing functions.

When finally either one or two detected light energy signal peaks are determined to be valid, the corresponding lens power signal, or signals, which have been stored therewith are then utilized to provide an indication of the power of the test lens via the output data conductors 76 which are extended to suitable display and/or printout means 78. The displayed data may be expressed in terms of the power of the lens, in diopters, in the respective principal meridian or, alternatively, it may be expressed with a sphere power component and a plus (+) or minus (−) cylinder component representative of the difference between the two powers, as is known in the ophthalmic lens art.

While a preferred embodiment of the invention has been shown and described, various modifications and substitutions may be made thereto without departing from the spirit and scope of the present invention. For instance, the beam splitter 40 might have been positioned intermediate target lens 44 and focal plane 20 providing that it, lens 42, plate 36 and detector 34 move with the target lens. Similarly, the computer 68 might be replaced with hard-wired logic circuitry. Accordingly, it is to be understood that the present invention has been described by way of illustration and not limitation.

What is claimed is:

1. Apparatus for testing the refractive power(s) of lenses which may possess cylindrical power comprising, in combination:
   (a) an optical system having an optical axis, said optical system comprising a station on said optical axis for a lens to be tested, a reflecting means at one end of said system, a laser emitting a collimated beam of light, a target lens through which said collimated laser beam passes for focusing said beam in a small generally circular diffraction image substantially coaxial with said optical axis at a target position on said optical axis for projection through said optical system along said optical axis, said projected light being reflected back through said optical system along said optical axis by said reflecting means, means for focusing said projected light at said reflecting means and for refocusing said reflected light at said target position, occluding means having a small, generally circular aperture therein on said optical axis, said occluding means being positioned on said optical axis at a position optically equivalent to said target position, said occluding means and said target position being axially spaced from said reflecting means along said optical axis, said axial spacing of said occluding means being greater than said axial spacing of said target position whereby said reflected light passes through said target position prior to said occluding means aperture, and relay lens means positioned on said optical axis intermediate said target position and said occluding means for focusing said reflected diffraction image on said optical axis at said occluding means;
   (b) means for supporting a lens in said optical system at said station;
   (c) means for varying the axial spacing between said target position and an other portion of said optical system so as to refocus said reflected light at said target position when a lens is positioned at said station, the axial spacing between said target position and said other optical system portion when said reflected light is refocused at said target position being indicative of the refractive power in a respective one of the principal meridians of said lens;
   (d) light sensing means positioned to receive only that portion of said light reflected back through said optical system and said occluding means aperture and to generate an electrical signal the amplitude of which is related to the intensity of said sensed light, said diffraction image and said aperture each being configured such that the intensity of said sensed light peaks whenever said reflected light is substantially refocused at said occluding means and said target position in each principal meridian of a said lens regardless of the angular orientation of said principal meridian, there being a single said peak when the lens at said station only possesses sperical power and two said peaks when the lens additionally possesses cylindrical power; and
   (e) means coupled to said light sensing means and being responsive to at least said light intensity signal for indicating substantially the refractive powers of the respective principal meridians of a lens positioned at said station as a function of the occurrence of said sensed light intensity peaks relative to said axial spacing between said other portion of said optical system and said target position whereby both the spherical power and the cylindrical power of the lens at said station are determined without regard for the angular orientation of the principal meridians of said lens about said optical axis.

2. The apparatus of claim 1 wherein said relay lens means comprise said target lens for collimating said reflected light and object lens means positioned intermediate said target lens and said occluding means for imaging said target position at said occluding means.

3. The apparatus of claim 2 including beam splitting means on the optical axis of said optical system intermediate and target lens and said objective lens, said collimated beam of light emitted by said laser being incident on said beam splitting means for introduction to said optical system along said optical axis.

4. The apparatus of claim 3 wherein said target lens is translatable along said optical axis thereby to move said target position along said optical axis relative to said test lens station.

5. The apparatus of claim 4 wherein said aperture in said occluding means is circular and has a diameter which is less than the minimum dimension of said reflected light at said occluding means.

6. The apparatus of claim 1 including beam splitting means on the optical axis of said optical system intermediate said target lens and said occluding means, said collimated beam of light emitted by said laser being incident on said beam splitting means for introduction to said optical system along said optical axis.

7. Apparatus for testing the refractive power(s) of lenses which may possess cylindrical power comprising, in combination:
(a) an optical system having an optical axis, said optical system comprising a station on said optical axis for a lens to be tested, a reflecting means at one end of said system, means for providing a small generally circular spot of light substantially coaxial with said optical axis at a target position on said optical axis for projection through said optical system along said optical axis, said projected light being reflected back through said optical system along said optical axis by said reflecting means, means for focusing said projected light at said reflecting means and for refocusing said reflected light at said target position, and occluding means having a small, generally circular aperture therein on said optical axis, said occluding means being positioned on said optical axis at a position optically equivalent to said target position;
(b) means for supporting a lens in said optical system at said station;
(c) means for varying the axial spacing between said target position and an other portion of said optical system so as to refocus said reflected light at said target position when a lens is positioned at said station, the axial spacing between said target position and said other optical system portion when said reflected light is refocused at said target position being indicative of the refractive power in a respective one of the principal meridians of said lens;
(d) means responsive to said variable axial spacing between said target position and said optical system portion for providing an electrical signal indicative thereof, said electrical signal being representative of the refractive power of a lens positioned at said station when said reflected light is refocused at said target position;
(e) light sensing means positioned to receive only that portion of said light reflected back through said optical system and said occluding means aperture and to generate an electrical signal the amplitude of which is related to the intensity of said sensed light, said projected spot of light and said aperture each being configured such that the intensity of said sensed light peaks whenever said reflected light is substantially refocused at said occluding means and said target position in each principal meridian of a said lens regardless of the angular orientation of said principal meridian, there being a single said peak when the lens at said station only possesses spherical power and two said peaks when the lens additionally possesses cylindrical power; and
(f) means coupled to said axial spacing indicating means and said light sensing means and being responsive to said refractive power representing signal and to light intensity signals only exceeding a predetermined threshold level for directly indicating substantially the refractive powers of the respective principal meridians of a lens positioned at said station as a function of the occurrence of said sensed light intensity peaks relative to said axial spacing between said other portion of said optical system and said target position whereby both the spherical power and the cylindrical power of the lens at said station are determined without regard for the angular orientation of the principal meridians of said lens about said optical axis.

8. Apparatus for testing the refractive power(s) of lenses which may possess cylindrical power comprising, in combination:
(a) an optical system having an optical axis, said optical system comprising a station on said optical axis for a lens to be tested, a reflecting means at one end of said system, means for providing a small generally circular spot of light substantially coaxial with said optical axis at a target position on said optical axis for projection through said optical system along said optical axis, said projected light being reflected back through said optical system along said optical axis by said reflecting means, means for focusing said projected light at said reflecting means and for refocusing said reflected light at said target position, and occluding means having a small, generally circular aperture therein on said optical axis, said occluding means being positioned on said optical axis at a position optically equivalent to said target position;
(b) means for supporting a lens in said optical system at said station;
(c) means for varying the axial spacing between said target position and an other portion of said optical system so as to refocus said reflected light at said target position when a lens is positioned at said station, the axial spacing between said target position and said other optical system portion when said reflected light is refocused at said target position being indicative of the refractive power in a respective one of the principal meridians of said lens;
(d) means responsive to said variable axial spacing between said target position and said optical system portion for providing an electrical signal indicative thereof, said electrical signal being representative of the refractive power of a lens positioned at said station when said reflected light is refocused at said target position;

(e) light sensing means positioned to receive only that portion of said light reflected back through said optical system and said occluding means aperture and to generate an electrical signal the amplitude of which is related to the intensity of said sensed light, said projected spot of light and said aperture each being configured such that the intensity of said sensed light peaks whenever said reflected light is substantially refocused at said occluding means and said target position in each principal meridian of a said lens regardless of the angular orientation of said principal meridian, there being a single said peak when the lens at said station only possesses spherical power and two said peaks when the lens additionally possesses cylindrical power; and (f) means coupled to said axial spacing indicating means and said light sensing means and being responsive to said refractive power representing signal and to no more than the two said light intensity signal peaks of greatest magnitude for directly indicating substantially the refractive powers of the respective principal meridians of a lens positioned at said station as a function of the occurrence of said sensed light intensity peaks relative to said axial spacing between said other portion of said optical system and said target position whereby both the spherical power and the cylindrical power of the lens at said station are determined without regard for the angular orientation of the principal meridians of said lens about said optical axis.

9. The apparatus of claim 8 wherein said lens power indicating means is further responsive to only that light intensity signal peak of greatest magnitude if the relative magnitude between said two signal peaks differs substantially.

* * * * *

UNITED STATES PATENT AND TRADEMARK OFFICE
CERTIFICATE OF CORRECTION

PATENT NO. : 4,090,790
DATED : May 23, 1978
INVENTOR(S) : Dragon et al.

It is certified that error appears in the above–identified patent and that said Letters Patent are hereby corrected as shown below:

In column 11, line 13, delete "and" and insert --said--.

Signed and Sealed this

Twenty-sixth Day of September 1978

[SEAL]

Attest:

RUTH C. MASON
Attesting Officer

DONALD W. BANNER
Commissioner of Patents and Trademarks